(12) United States Patent
Jung

(10) Patent No.: US 8,853,123 B2
(45) Date of Patent: Oct. 7, 2014

(54) LNT CATALYST WITH ENHANCED NITROGEN OXIDE STORAGE CAPACITY AT LOW TEMPERATURE

(71) Applicant: Hyundai Motor Company, Seoul (KR)

(72) Inventor: Chang Ho Jung, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/854,289

(22) Filed: Apr. 1, 2013

(65) Prior Publication Data

US 2014/0171302 A1 Jun. 19, 2014

(30) Foreign Application Priority Data

Dec. 18, 2012 (KR) ................. 10-2012-0148964

(51) Int. Cl.
| | | |
|---|---|---|
| B01J 23/00 | (2006.01) | |
| B01J 23/02 | (2006.01) | |
| B01J 23/04 | (2006.01) | |
| B01J 23/06 | (2006.01) | |
| B01J 23/08 | (2006.01) | |
| B01J 23/10 | (2006.01) | |
| B01J 23/42 | (2006.01) | |
| B01J 23/44 | (2006.01) | |
| B01J 23/46 | (2006.01) | |
| B01J 23/58 | (2006.01) | |
| B01J 21/04 | (2006.01) | |
| B01J 20/00 | (2006.01) | |
| B01J 23/63 | (2006.01) | |

(52) U.S. Cl.
CPC .............. *B01J 23/63* (2013.01); *Y10S 502/524* (2013.01); *Y10S 502/52719* (2013.01)
USPC ........... 502/328; 502/304; 502/332; 502/333; 502/334; 502/339; 502/341; 502/355; 502/415; 502/439; 502/524; 502/527.19

(58) Field of Classification Search
CPC . B01J 21/04; B01J 21/10; B01J 23/38–23/46; B01J 23/58; B01J 23/63
USPC ......... 502/304, 328, 332–334, 339, 341, 355, 502/415, 439, 524
See application file for complete search history.

(56) References Cited

U.S. PATENT DOCUMENTS 6,391,822 B1 * 5/2002 Dou et al. ................. 502/325
6,395,675 B1 * 5/2002 Suga et al. ................. 502/326

(Continued)

FOREIGN PATENT DOCUMENTS

| JP | 07213902 A | 8/1995 |
|---|---|---|
| JP | 09-262471 | 10/1997 |

(Continued)

*Primary Examiner* — Cam N. Nguyen
(74) *Attorney, Agent, or Firm* — Edwards Wildman Palmer LLP; Peter F. Corless

(57) ABSTRACT

Disclosed is a lean NOx trap (LNT) catalyst with enhanced NOx storage capacity at low temperature. More particularly, an LNT catalyst with enhanced NOx storage capacity at low temperature and significantly inhibited thermal desorption is prepared by coating a washcoat on a honeycomb-type carrier and drying and baking the same. The washcoat contains a first catalyst powder in which barium (Ba) and a precious metal are supported on a ceria support, and a second catalyst powder in which a precious metal is supported on a magnesium (Mg)-substituted alumina support The LNT catalyst of the present invention is useful as a NOx reducing catalyst for a passenger diesel vehicle.

10 Claims, 7 Drawing Sheets

(56) References Cited

U.S. PATENT DOCUMENTS

| | | | |
|---|---|---|---|
| 6,562,753 B2 * | 5/2003 | Miyoshi et al. | 502/325 |
| 6,677,272 B2 * | 1/2004 | Beall et al. | 502/439 |
| 6,777,370 B2 * | 8/2004 | Chen | 502/241 |
| 6,897,182 B2 * | 5/2005 | Cutler et al. | 502/302 |
| 7,329,629 B2 * | 2/2008 | Gandhi et al. | 502/325 |
| 7,351,382 B2 * | 4/2008 | Pfeifer et al. | 422/177 |
| 7,947,238 B2 * | 5/2011 | Deeba | 423/213.2 |
| 8,022,010 B2 * | 9/2011 | Hilgendorff et al. | 502/304 |
| 8,337,791 B2 * | 12/2012 | Kohara et al. | 423/213.2 |
| 8,372,366 B2 * | 2/2013 | Sato et al. | 423/235 |
| 8,592,337 B2 * | 11/2013 | Hilgendorff et al. | 502/304 |
| 8,641,993 B2 * | 2/2014 | Dotzel et al. | 423/213.2 |
| 8,652,429 B2 * | 2/2014 | Sumiya et al. | 423/213.2 |
| 2001/0051122 A1 * | 12/2001 | Hori et al. | 423/213.5 |
| 2002/0082164 A1 * | 6/2002 | Dou et al. | 502/304 |
| 2004/0198595 A1 * | 10/2004 | Chen | 502/328 |
| 2008/0120970 A1 * | 5/2008 | Hilgendorff et al. | 60/299 |
| 2009/0320457 A1 * | 12/2009 | Wan | 60/299 |
| 2011/0154807 A1 * | 6/2011 | Chandler et al. | 60/284 |
| 2011/0305612 A1 * | 12/2011 | Muller-Stach et al. | 423/212 |
| 2011/0305615 A1 * | 12/2011 | Hilgendorff | 423/213.5 |
| 2012/0055141 A1 * | 3/2012 | Hilgendorff | 60/301 |
| 2012/0055142 A1 * | 3/2012 | Hilgendorff | 60/301 |
| 2013/0209337 A1 * | 8/2013 | Cooper et al. | 423/213.5 |
| 2013/0287658 A1 * | 10/2013 | McKenna | 423/213.5 |

FOREIGN PATENT DOCUMENTS

| | | |
|---|---|---|
| JP | 10-249199 | 9/1998 |
| JP | 2000176298 A | 6/2000 |
| KR | 10-2009-0086517 | 8/2009 |
| KR | 10-2010-0061152 | 6/2010 |

* cited by examiner

LNT CATALYST WITH ENHANCED NITROGEN OXIDE STORAGE CAPACITY AT LOW TEMPERATURE

CROSS-REFERENCE TO RELATED APPLICATIONS

This application claims priority under 35 U.S.C. §119 to Korean Patent Application No. 10-2012-0148964, filed on Dec. 18, 2012, in the Korean Intellectual Property Office, the disclosure of which is incorporated herein by reference in its entirety.

BACKGROUND (a) Technical Field

The present invention relates to a lean NOx trap (LNT) catalyst with enhanced NOx storage capacity at low temperature. In particular, the present invention relates to an LNT catalyst with enhanced NOx storage capacity at low temperature and with significantly inhibited thermal desorption, which includes a first catalyst powder in which barium (Ba) and a precious metal are supported on a ceria support and a second catalyst powder in which a precious metal is supported on a magnesium (Mg)-substituted alumina support. More particularly, the first and second catalyst powders are provided as a washcoat which is coated on a honeycomb-type carrier, followed by and drying and baking to form the LNT catalyst.

(b) Background Art

A storage-type lean NOx hap (LNT) catalyst reduces emission of nitrogen oxides (NOx) by storing them in the form of nitrates under a lean burn condition. In the lean burn condition, reduction of NOx by a precious metal is difficult due to high oxygen content in an exhaust gas as compared to the theoretical air-fuel ratio at which a fuel can be completely burnt by air. After a prolonged time, when the NOx storage capacity of the catalyst reaches an upper limit, the oxygen content in the exhaust gas is decreased through post-injection control. Te content of reducing components, such as CO/HC, is then increased, such that the stored nitrates are desorbed and reduced to nitrogen ($N_2$) by reducing agents (e.g., HC, CO, $H_2$, etc.) as shown below:

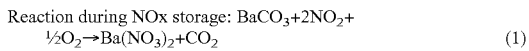
(1)

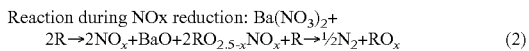
(2)

(In (2), R denotes a reducing agent.)

The NOx storage occurs in a temperature range of 100-400° C. and the NOx reduction occurs at 250° C. or above. In the case of an LNT catalyst for a diesel engine, the NOx storage occurs at a temperature lower the above temperature range and, thus, cerium (Ce) is often used together with barium (Ba) to store NOx. Although cerium (Ce) has good storage capacity at low temperature as compared with barium (Ba), it has a smaller storage capacity than Ba. Hence, when the catalyst temperature rises abruptly due to acceleration of a vehicle, the cerium (Ce) fails to store the adsorbed NOx, and instead releases it (thermal desorption). This is the major cause of poor NOx purification.

The LNT catalyst was proposed in early 1990s by Toyota Motor Corporation, when it was developed as a lean-burn gasoline catalyst. In application, an additional three-way catalyst is disposed before the LNT catalyst. Since the catalytic reaction temperature is higher for a gasoline engine than a diesel engine, a catalyst containing as much as 10-20 wt % of a high-temperature storage material such as Ba, K, etc. was developed. Later, a catalyst further containing Ce for storage at low temperature was developed.

As a support of the LNT catalyst, alumina is mainly used. Korean Patent Application Publication No. 2009-0086517 describes NOx storage catalysts wherein a metal such as platinum, palladium, cobalt, etc. and barium are supported on a porous alumina support. Korean Patent Application Publication No. 2010-0061152 describes a NOx storage catalyst consisting of a diesel fuel cracking catalyst, a nitrogen oxide storage layer and a nitrogen reduction layer, wherein the nitrogen oxide storage layer includes a catalyst in which barium (Ba) is coated on an alumina support and the nitrogen reduction layer includes a catalyst in which platinum (Pt) is supported on an alumina-ceria ($Al_2O_3$—$CeO_2$) support. However, supporting barium (Ba) on the alumina support leads to formation of $BaAl_2O_4$ as a result of reaction between barium and alumina. This undesirably decreases NOx storage capacity. In an attempt to solve this problem, use of a magnesium (Mg)-substituted spinel alumina ($MgAl_2O_4$) support was developed.

Due to the recently announced Euro VI emission standard, NOx reducing catalysts will be increasingly used in most diesel vehicles to meet the new standards. Further, because Euro VI lowered the allowed NOx emission by about half as compared to the prior Euro V emission standard, further improvements in the NOx reducing catalyst are necessary.

SUMMARY

The present invention is directed towards providing an improved lean NOx trap (LNT) catalyst that can be used for a diesel passenger vehicle so as to satisfy the Euro VI emission standard.

More particularly, the present invention is directed towards providing a new LNT catalyst with improved NOx storage capacity, including at low temperature conditions, and which further inhibits thermal desorption.

In an aspect, the present invention provides a storage-type LNT catalyst comprising a first catalyst powder and a second catalyst powder. In particular, a first catalyst powder is one in which barium (Ba) and a precious metal are supported on a ceria support, and a second catalyst powder is one in which a precious metal is supported on a magnesium (Mg)-substituted alumina support. A washcoat containing the first and second catalyst powders is prepared and coated on a honeycomb-type carrier, followed by drying and baking to thus prepare the LNT catalyst.

Other aspects and exemplary embodiments of the invention are discussed infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1:
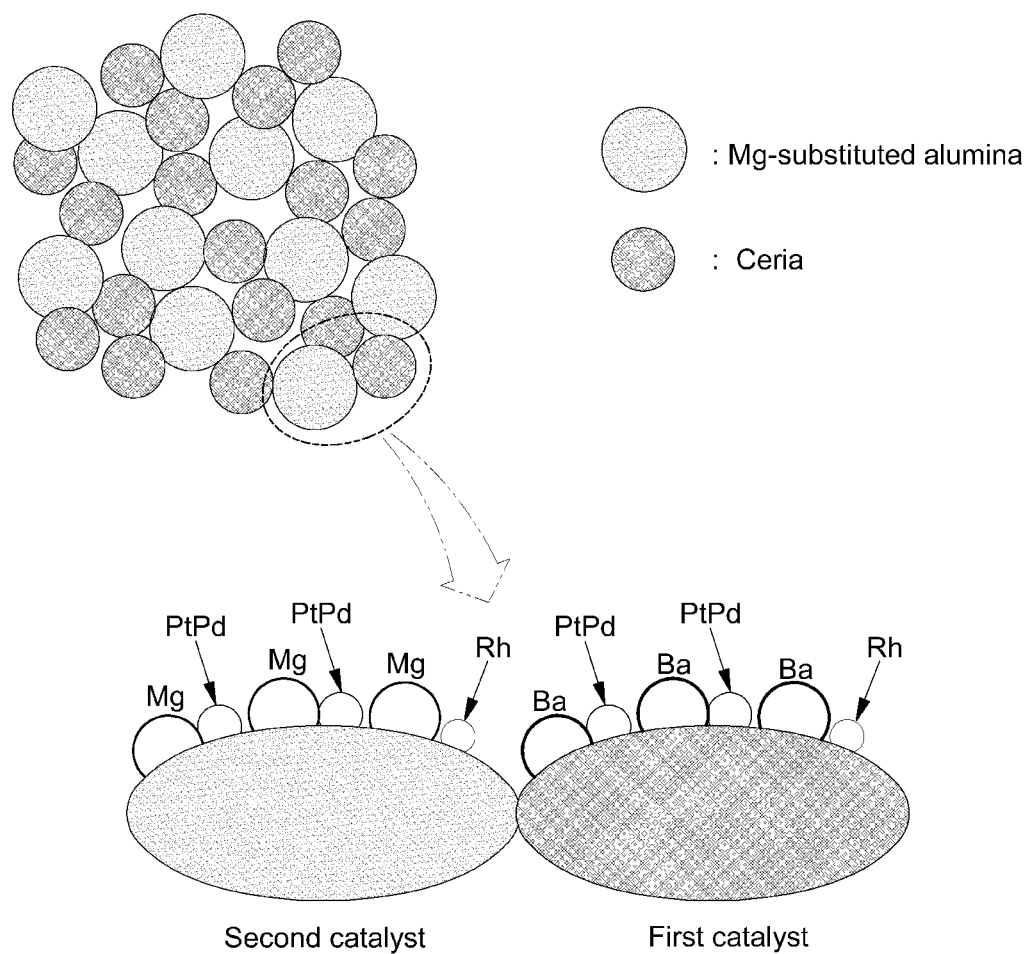
FIG. 1 shows a microstructure of a lean NOx trap (LNT) catalyst according to the present invention.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The present invention relates to a new lean NOx trap (LNT) catalyst with improved NOx storage capacity at low temperature and with inhibited thermal desorption.

A general depiction of the microstructure of the LNT catalyst of the present invention is shown in FIG. 1. According to embodiments of the present invention, the LNT catalyst is prepared by coating a washcoat containing a first and second catalyst powder on a honeycomb-type carrier and drying and baking the same. In particular, the first catalyst powder and the second catalyst powder are such that barium (Ba) and a precious metal are supported in different compositions.

According to a preferred embodiment, the first catalyst is prepared by supporting barium (Ba) and a precious metal on a ceria support. The second catalyst is prepared by supporting a precious metal on a magnesium (Mg)-substituted alumina support.

More particularly, the first catalyst is prepared by supporting barium (Ba) on the ceria support in order to minimize formation of $BaAl_2O_4$, which causes reduction of NOx storage capacity. Further, the alumina support used for the second catalyst is partially substituted with magnesium (Mg) in order to prevent direct reaction of barium (Ba) with alumina in the washcoat by distributing fine magnesium oxide (MgO) particles on the surface of alumina.

Hereinafter, a preferred embodiment of the LNT catalyst of the present invention will be described in further detail.

The LNT catalyst of the present invention may contain about 55-70 wt % of the ceria support, about 20-35 wt % of the magnesium (Mg)-substituted alumina support, about 1-8 wt % of the barium (Ba) and about 0.1-2 wt % of the precious metal, wherein all wt % are based on the total weight of the washcoat.

The precious metal supported in the LNT catalyst of the present invention may be one or more selected from a group consisting of platinum (Pt), palladium (Pd) and rhodium (Rh). According to an exemplary embodiment, a precious metal including about 60-85 wt % of platinum (Pt), about 10-40 wt % of palladium (Pd) and about 2-10 wt % of rhodium (Rh) is used. The precious metal is supported on the first catalyst and the second catalyst.

The supporting amount (i.e., amount of the support material) of the first catalyst is about 30-70 wt % and the second catalyst is about 70-30 wt % relative to the total amount of the precious metal, respectively. The supporting amount may vary depending on the properties of exhaust gas from the engine. In order to enhance oxidation of CO and HC, the amount of the precious metal supported on the alumina of the second catalyst may be increased. And, in order to improve NOx storage capacity, the amount of the precious metal supported on the ceria of the first catalyst may be increased.

In particular, the first catalyst is a catalyst prepared by supporting barium (Ba) and the precious metal on the ceria support. In the present invention, barium (Ba) is used as a NOx storage material. The supporting of barium (Ba) on the ceria support may provide a synergic effect on NOx storage capacity through the formation of Ce—Ba. Indeed, NOx can be stably stored without thermal desorption even when the barium (Ba) content is maintained low at about 1-8 wt % (based on total weight of the first catalyst). In particular, by supporting barium (Ba) on the alumina support in accordance with the present invention, the problem of decreased NOx storage capacity in existing materials due to formation of $BaAl_2O_4$ can be avoided.

Further, the second catalyst is prepared by supporting the precious metal on alumina. Since alumina reacts with barium (Ba) and forms $BaAl_2O_4$, which interferes with NOx storage as described above, the present invention partially substitutes alumina with magnesium (Mg). According to preferred embodiments, the support used to prepare the second catalyst is substituted with a relatively excess amount of magnesium (Mg), particularly about 25-33 mol % magnesium based on the alumina. As a result, NOx storage capacity at a low catalytic reaction temperature of about 150° C. or below is maximized. If the magnesium is substituted in an amount of less than 25 mol %, NOx storage capacity may decrease since $BaAl_2O_4$ can be formed more easily. On the other hand, if magnesium is substituted in an amount exceeding about 33 mol %, the surface area on which the precious metal can be supported decreases. After the magnesium-substituted alumina is baked, fine magnesium oxide (MgO) particles having an $MgAl_2O_4$ spinel structure are distributed on the surface, which prevents the formation of $BaAl_2O_4$ from reaction between barium and alumina. According to experiments performed by the inventors of the present invention, when the alumina is substituted with an Mg—Ba alloy by supporting of a trace amount of barium (Ba) on the magnesium-substituted alumina support, unexpectedly improved NOx storage capacity is achieved at relatively high temperatures. Accordingly, in the present invention, a trace amount of barium (Ba) may be supported on the magnesium-substituted alumina support in order to enhance NOx storage capacity at both low and high temperatures. According to preferred embodiments, the trace amount of the barium (Ba) supported on the magnesium-substituted alumina support is less than about 1 wt %, specifically about 0.1-1 wt %, based on the total weight of the washcoat.

Hereinafter, the LNT catalyst of the present invention described above will be described in more detail centered on a preparation method thereof.

Metals used to prepare the catalyst of the present invention are barium and precious metal. The barium and precious metal may be provided in the form of precursor compounds commonly used for preparation of catalysts. For example, according to various embodiments, the barium and precious metal may be provided in the form of a halide, hydroxide, acetate, nitrate, ammonium salt, sulfate, etc.

Particular examples of the metal precursor compounds that can be used in the preparation of the catalyst of the present invention include, but are not limited to the following. A barium (Ba) precursor may be selected from one or more of $BaCl_2$, $Ba(OH)_2$, $Ba(NO_3)_2$, $Ba(OAc)_2$, etc. According to an exemplary embodiment, barium acetate is used. For the precious metal, a platinum (Pt) precursor may used and may be selected from one or more of $PtCl_4$, $H_2PtCl_6$, $Pt(NH_3)_4Cl_2$, $(NH_4)_2PtCl_2$, $H_2PtBr_6$, $NH_4[Pt(C_2H_4)C_{13}]$, $Pt(NH_3)_4(OH)_2$, $Pt(NH_3)_2(NO_2)_2$, etc. According to an exemplary embodiment, platinum chloride is used. Further, a palladium (Pd) precursor may be selected from one or more of $(NH_4)_2PdCl_6$, $(NH_4)_2PdCl_4$, $Pd(NH_3)_4Cl_2$, $PdCl_2$, $Pd(NO_3)_2$, etc. A rhodium (Rh) precursor may be selected from one or more of $Na_3RhCl_6$, $(NH_4)_2RhCl_6$, $Rh(NH_3)_5Cl_3$, $RhCl_3$, etc.

The ceria ($CeO_2$) support and the alumina ($Al_2O_3$) support used for preparation of the first and second catalysts of the present invention may be any commonly used in the art. In particular, these supports may have a specific surface area of about 50-350 $m^2/g$. In general, catalytic activity increases with specific surface area. Further, it has been found that if the specific surface area is smaller than 50 $m^2/g$, the storage material and the precious metal may not be dispersed well. On the other hand, if the specific surface area exceeds 350 $m^2/g$, resistance of the alumina to deterioration may be insufficient. Hence, the aforesaid range is preferred. Further, according to various embodiments, the ceria ($CeO_2$) may have an average particle size of about 2-7 μm and the alumina ($Al_2O_3$) may have an average particle size of about 7-15 μm.

According to the present invention, the alumina ($Al_2O_3$) support used in the present invention is one in which aluminum (Al) is partially substituted with magnesium (Mg). The magnesium (Mg)-substituted alumina support may be prepared by any conventional sol-gel method using an aluminum precursor and a magnesium precursor. After the sol-gel reaction, the support is baked at an elevated temperature, such as to uniformly distribute fine magnesium oxide (MgO) particles on the surface of alumina. In the following examples, commercially available magnesium (Mg)-substituted alumina was used.

The metal precursors may be supported on the support according to any commonly employed method without particular limitation. In the following examples, metals were supported on the support mainly by impregnation. After the metal is thus supported, the first catalyst powder and the second catalyst powder are provided through drying and heat treatment. According to preferred embodiments, the drying is performed in an oven at a temperature of about 60-150° C. for about 3-10 days, and the heat treatment is performed at about 250-900° C. for about 3-10 hours.

The thus prepared first catalyst powder and second catalyst powder are then dispersed in a dispersion medium to obtain a washcoat solution in the form of a slurry. The dispersion medium may be any conventional medium. Preferably distilled water and acetic acid are used to control pH thereby facilitating electrostatic dispersion between particles. According to various embodiments, the content of the catalyst solid in the dispersion medium may be about 20-50 wt % based on total weight of the catalyst solid plus the dispersion medium. In order to induce electrostatic repulsion between particles, the pH of the slurry should be adjusted to 8 or lower. After the washcoat solution is coated on a honeycomb-type carrier, it is dried at about 60-150° C. and then baked at about 250-900° C. to obtain the desired LNT catalyst.

EXAMPLES

The present invention will be described in more detail through examples. The following examples are for illustrative purposes only and it will be apparent to those skilled in the art not that the scope of this invention is not limited by the examples.

Examples

Preparation of Lean NOx Trap (LNT) Catalyst

Example

LNT Catalyst

A first catalyst powder and a second catalyst powder were prepared according to the commonly employed impregnation method. The powder was then prepared into a washcoat solution in the form of a slurry. The washcoat solution was coated on a honeycomb-type carrier at 400 g/L, dried at 110° C. for 3 hours and then baked at 500° C. for 5 hours to prepare an LNT catalyst in accordance with the present invention.

As a support for the first catalyst, ceria (CeO$_2$) particles with a specific surface area of 85 m$^2$/g and an average particle size of 2-7 μm were used. As a support for the second catalyst, alumina (Al$_2$O$_3$) particles substituted with 30 mol % of magnesium (Mg) based on alumina, with a specific surface area of 150 m$^2$/g and an average particle size of 7-15 μm, were used.

Barium (Ba) and a precious metal consisting of Pt:Pd:Rh (75:20:5 based on weight) were supported on the ceria (CeO$_2$) support, and a precious metal consisting of Pt:Pd:Rh (75:20:5 based on weight) was supported on the magnesium-substituted alumina (Al$_2$O$_3$) support.

Based on the total weight of the washcoat, the weight proportions of the ceria (CeO$_2$) support, the magnesium-substituted alumina (Al$_2$O$_3$), the barium (Ba) and the precious metal were 67 wt %, 25 wt %, 7 wt % and 1 wt %, respectively. It is noted that the dispersion medium may be added (e.g. in the range of 5 wt % or less) during the catalyst manufacturing process. However, the dispersion medium is eventually removed during the process after washcoating, and thus the dispersion medium is not included in the final catalyst composition and is not reflected in the above wt % forming the washcoat. The precious metal was supported on the first catalyst and the second catalyst at a ratio of 7:3 based on weight.

Figure 2A:
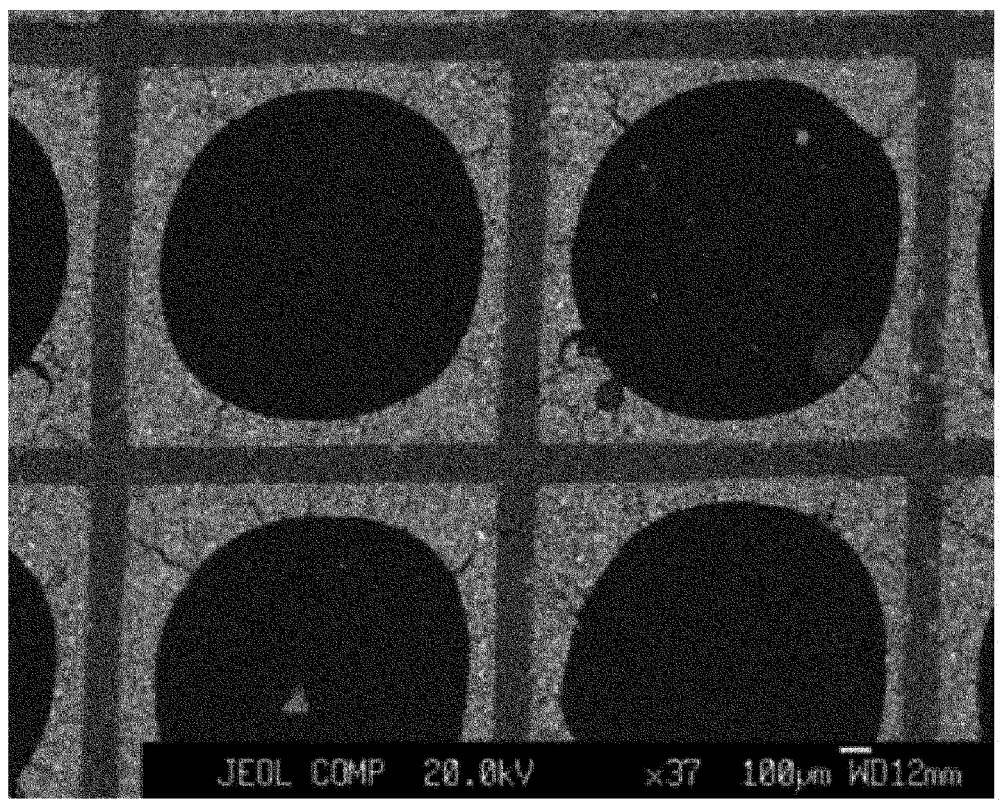
FIG. 2A shows electron microscopic image of a washcoat coating layer of an LNT catalyst according to an embodiment of the present invention (a: ×37 magnification)
Figure 2B:
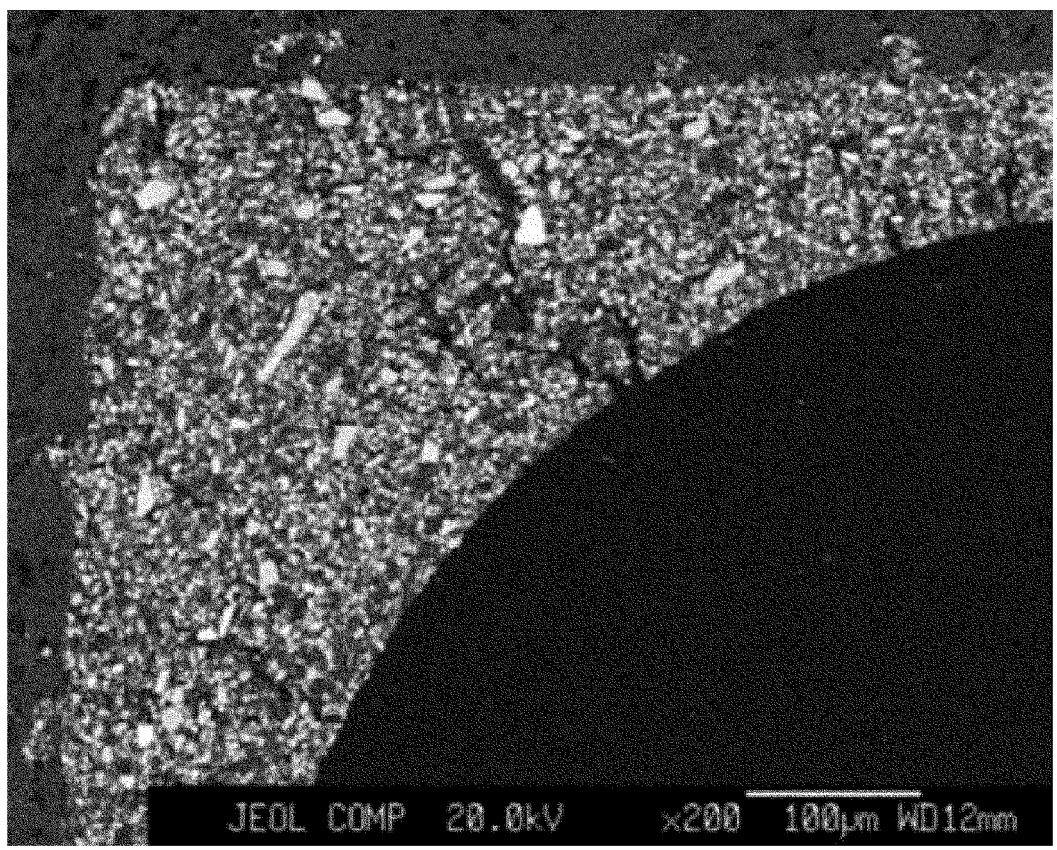
FIG. 2B shows electron microscopic image of a washcoat coating layer of an LNT catalyst according to an embodiment of the present invention (b: ×200 magnification)
Figure 2C:
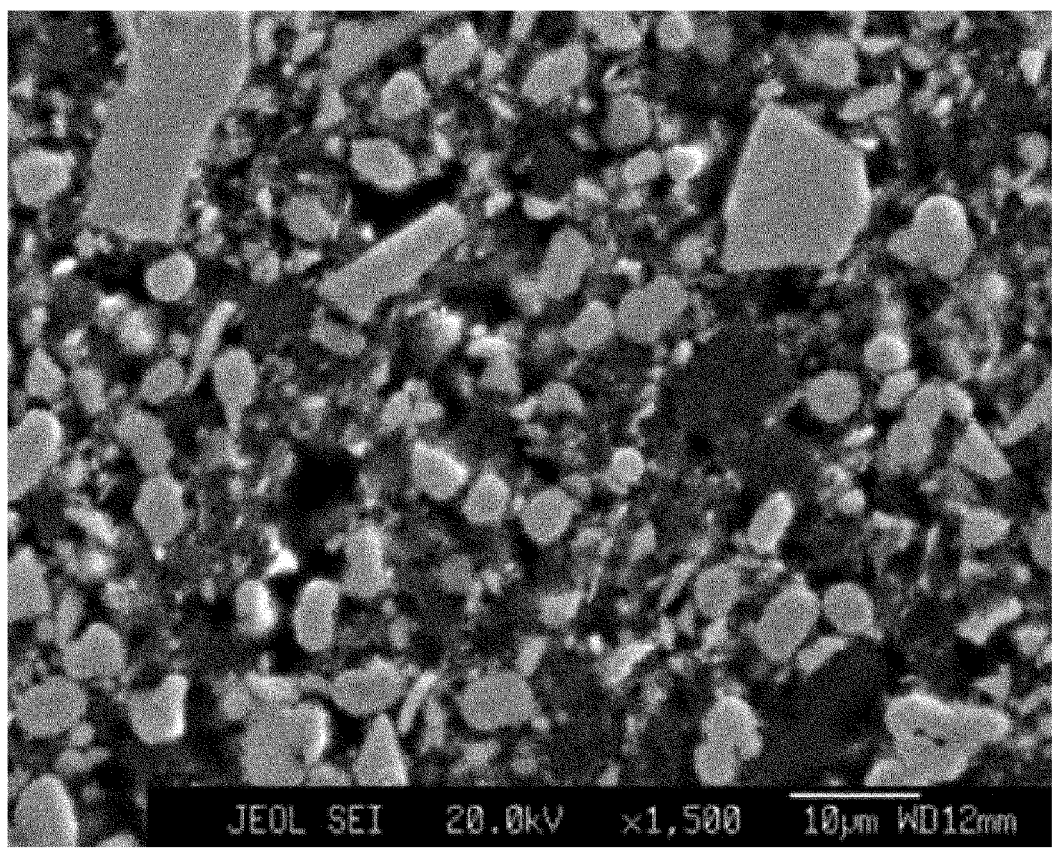
FIG. 2C shows electron microscopic image of a washcoat coating layer of an LNT catalyst according to an embodiment of the present invention (c: ×1500 magnification)

Electron microscopic images of the washcoat coating layer of the prepared LNT catalyst are shown in FIG. 2.

As demonstrated in FIG. 2, Mg-substituted alumina particles (gray particles) and ceria particles (white particles) of several to 20 μm formed a network structure.

Comparative Example

Comparative LNT Catalyst

A first catalyst powder and a second catalyst powder prepared according to the commonly employed impregnation method and prepared into a washcoat solution in the form of a slurry as in the Example above. The washcoat solution was coated on a honeycomb-type carrier at 400 g/L, dried at 110° C. for 3 hours and then baked at 500° C. for 5 hours to prepare an LNT catalyst.

Based on the total weight of the washcoat (which does not include the dispersion medium as noted previously) the weight proportions of the ceria (CeO$_2$) support, the magnesium-substituted alumina (Al$_2$O$_3$), the barium (Ba) and the precious metal were 60 wt %, 25 wt %, 14 wt % and 1 wt %, respectively. As a support for the second catalyst, alumina (Al$_2$O$_3$) particles substituted with 20 mol % of magnesium (Mg) based on alumina, with a specific surface area of 150 m$^2$/g and an average particle size of 7-15 μm, were used.

Test Examples

Comparison of Catalyst Performance

Test Example 1

Comparison of NOx Purification Efficiency

In order to compare NOx purification performance of the LNT catalyst prepared in the Example, the comparative LNT catalyst prepared in the Comparative Example and a commercially available LNT catalyst, NOx purification performance was measured in a gas activity test station at different temperatures. After storage of NOx under a lean-burn condition for 52 seconds, the stored NOx was reduced under a rich condition for 8 seconds. The results are shown in FIG. 3 and FIG. 4.

Figure 3:
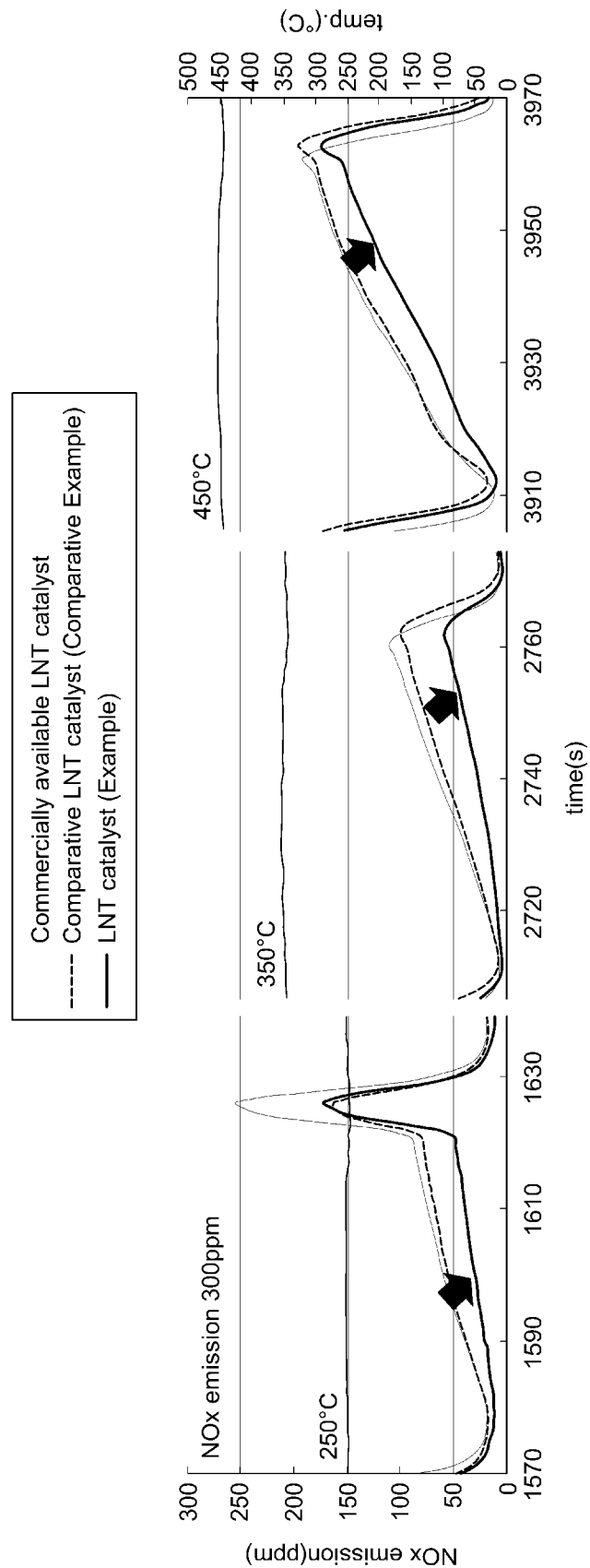
FIG. 3 compares NOx emission at 250° C. (low temperature), 350° C. (moderate temperature) and 450° C. (high temperature) for different LNT catalysts according to embodiments of the present invention.

FIG. 3 compares NOx emission at 250° C. (low temperature), 350° C. (moderate temperature) and 450° C. (high temperature) for different LNT catalysts. As demonstrated, the LNT catalyst of the Example, which is in accordance with the present invention, inhibited NOx emission in the low-temperature (250° C.) storage zone as compared to the comparative LNT catalyst (Comparative Example). This may be due to the use in the Example of the alumina support substituted with excess Mg. Also in the moderate- and high-temperature (350-450° C.) storage zones, the LNT catalyst of Example (present invention) exhibited superior NOx removal efficiency as compared to the comparative LNT catalyst (Comparative Example) and the commercially available catalyst. This was true even though the supporting amount of barium (Ba) effective for adsorption of NOx at high temperature was significantly decreased. This is due to the synergic effect of Ce—Ba formed by selectively supporting barium (Ba) on the ceria support in accordance with the present invention. This improvement of NOx storage capacity at moderate-to-high temperatures can reduce thermal desorption caused by abrupt increases in catalyst temperature.

Figure 4:
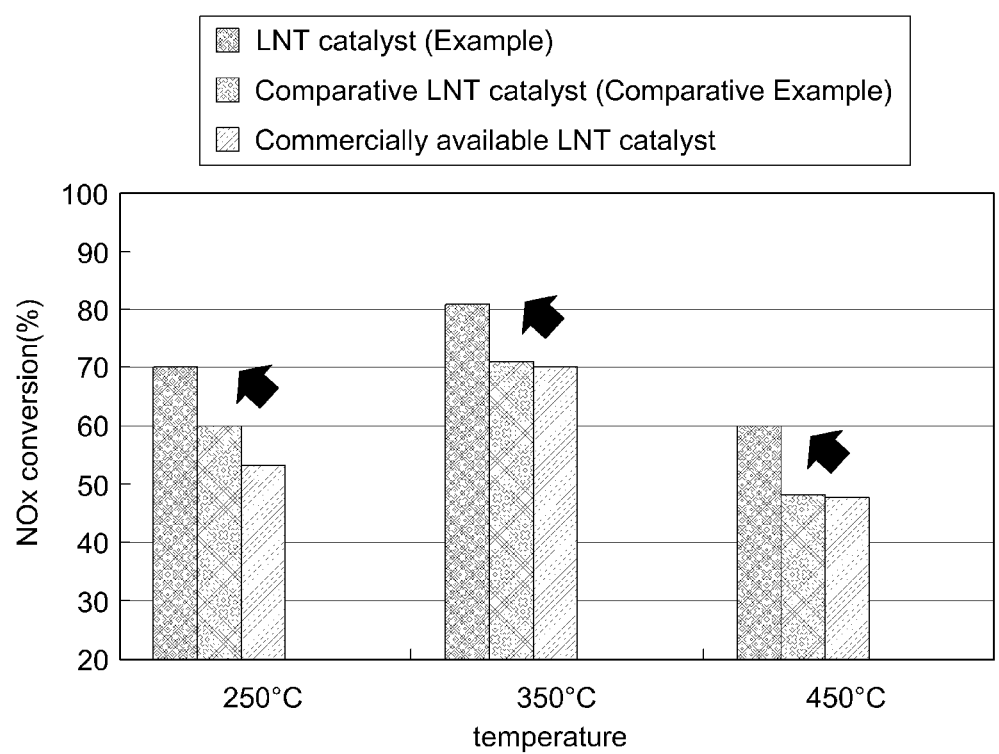
FIG. 4 compares NOx purification efficiency at 250° C. (low temperature), 350° C. (moderate temperature) and 450° C. (high temperature) for different LNT catalysts according to embodiments of the present invention.

FIG. 4 compares NOx purification efficiency of the different LNT catalysts. As demonstrated in FIG. 4, the LNT catalyst of the Example (present invention) exhibits improved purification efficiency as compared to the comparative LNT catalyst (Comparative Example) and the commercially available LNT catalyst in all temperature ranges from 250 to 450° C.

Test Example 2

Analysis of SO$_2$ Emission During Desulfurization

SO$_2$ emission during desulfurization was compared for the LNT catalysts prepared in the Example, the Comparative Example and a comparative LNT catalyst. Desulfurization was carried out by repeating lean and rich states while elevating temperature.

Figure 5:
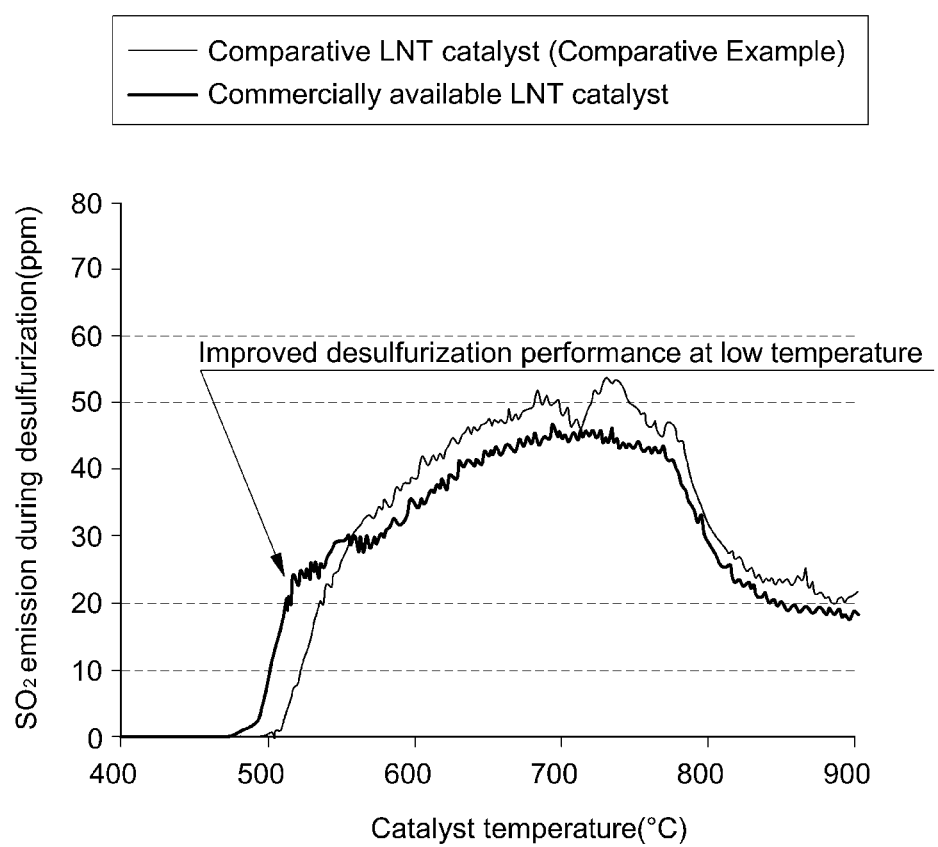
FIG. 5 compares desulfurization temperature for different LNT catalysts according to embodiments of the present invention.

FIG. 5 compares desulfurization temperature for the different LNT catalysts. It is noted that if a catalyst with low desulfurization temperature is used for a vehicle, fuel consumption can be reduced since the catalyst reaction temperature necessary for desulfurization is lowered. The LNT catalyst of the Example (present invention) exhibited a shift of SO$_2$ emission toward low temperatures as compared to the comparative LNT catalyst (Comparative Example). This may be due to the inhibited reaction between barium and alumina in the LNT catalyst according to the present invention (the Example) owing to enhanced NOx and SOx storage capacity.

As described above, the LNT catalyst of the present invention exhibits improved NOx purification performance at 250-350° C., which is the temperature range where a diesel engine for a passenger vehicle generally operates. Since the NOx purification performance is further maintained at high temperatures of about 450° C., the present invention catalyst ensures good NOx storage capacity at low temperature and inhibited thermal desorption of the stored NOx. Further, since the present invention catalyst can avoid the formation of BaAl$_2$O$_4$, desulfurization can be achieved at low temperatures.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A lean NOx trap (LNT) catalyst comprising:
   a washcoat which comprises a first catalyst powder and a second catalyst powder coated, dried and baked on a honeycomb-type carrier,
   wherein the first catalyst powder comprising barium (Ba) and a precious metal supported on a ceria support, and the second catalyst powder comprising a precious metal is supported on a magnesium (Mg)-substituted alumina support,
   wherein the LNT catalyst comprises about 55-70 wt % of the ceria support, about 20-35 wt % of the magnesium (Mg)-substituted alumina support, about 1-8 wt % of barium (Ba) and about 0.1-2 wt % of the precious metal,
   wherein the wt % are based on the total weight of the washcoat.

2. The LNT catalyst according to claim 1, wherein the magnesium (Mg)-substituted alumina support is substituted with about 25-33 mol % of magnesium (Mg) based on alumina.

3. The LNT catalyst according to claim 1, wherein the magnesium (Mg)-substituted alumina support has an $MgAl_2O_4$ spinel structure with fine magnesium oxide (MgO) particles distributed on the surface thereof.

4. The LNT catalyst according to claim 1, wherein the precious metal is one or more selected from a group consisting of platinum (Pt), palladium (Pd) and rhodium (Rh).

5. The LNT catalyst according to claim 4, wherein the precious metal comprises about 60-85 wt % of platinum (Pt), about 10-40 wt % of palladium (Pd) and about 2-10 wt % of rhodium (Rh).

6. The LNT catalyst according to claim 5, wherein the support of the first catalyst is provided at about 30-70 wt % relative to the total amount of the precious metal and the support of the second catalyst is provided at about 70-30 wt % relative to the total amount of the precious metal.

7. The LNT catalyst according to claim 4, wherein the support of the first catalyst is provided at about 30-70 wt % relative to the total amount of the precious metal and the support of the second catalyst is provided at about 70-30 wt % relative to the total amount of the precious metal.

8. The LNT catalyst according to claim 1, wherein the support of the first catalyst is provided at about 30-70 wt % relative to the total amount of the precious metal and the support of the second catalyst is provided at about 70-30 wt % relative to the total amount of the precious metal.

9. The LNT catalyst according to claim 1, wherein about 0.1-1 wt % of barium (Ba) is further supported on the second catalyst, wherein wt % is based on a total weight of the washcoat.

10. The LNT catalyst according to claim 1, wherein the support of the first catalyst is provided at about 30-70 wt % relative to the total amount of the precious metal and the support of the second catalyst is provided at about 70-30 wt % relative to the total amount of the precious metal.

* * * * *